Patented Apr. 2, 1935

1,996,116

UNITED STATES PATENT OFFICE 1,996,116

PROCESS FOR PRODUCING IONONES

Walter Christian Meuly, New Brunswick, N. J., assignor to E. I. du Pont de Nemours & Company, Wilmington, Del., a corporation of Delaware No Drawing. Application August 25, 1933,
Serial No. 686,773

4 Claims. (Cl. 260—132)

This invention relates to methods for the isomerization of ionone and its alkyl derivatives.

In the past ionones have been produced by reacting citral with a methyl-alkyl-ketone. The pseudo-ionone produced thereby was then isomerized by treatment with acids, or acid salts of polybasic acids. German Patent No. 73,089 describes the use of dilute acids, such as sulfuric acid, at boiling temperature for this purpose. German Patent No. 129,027 mentions that mineral acids and some of the stronger organic acids may be employed in this connection. German Patent No. 138,939 states that mono-sodium-sulfate may be used, and gives instructions whereby the conditions of the reaction are so regulated that this compound decomposes into a mixture of sulfuric acid and sodium sulfate. This patent also describes the use of ferric chloride, which liberates hydrochloric acid by hydrolysis. German Patent No. 157,647 mentions the possibility of using neutral salts which do not split off acids on heating. Calcium chloride, magnesium sulfate and sodium acetate are described herein; the reaction being carried out at high temperatures in an autoclave, and alcohol being used as a solvent.

It has heretofore been very difficult to obtain good yields of ionones due to side reactions which result in the production of deleterious contaminants such as resins. These prior art methods were also defective in that the acids used were in general quite expensive, and their removal from the product required tedious extractions or dilutions and reconcentrations. Furthermore, the extremely corrosive action of the acids as well as the high temperatures necessitated the use of expensive equipment.

It is an object of this invention to obtain high yields of ionones of excellent purity. A further object is to produce isomerization by means of relatively cheap and readily available isomerizing media. A still further object is to develop a process which eliminates the necessity of using expensive equipment, as well as the tedious methods of separating the product from the isomerizing media previously used. An additional object is to perfect a process which may be readily controlled, and which does not require highly skilled workers for its operation. Additional objects will become apparent from a consideration of the following description.

These objects are attained according to the herein described invention, wherein pseudo-ionones are treated with an aqueous solution of zinc iodide, zinc bromide, and/or zinc chloride. This treatment is preferably carried out at atmospheric pressure and at temperatures which are sufficiently elevated to cause the solution to reflux.

The invention may be more completely understood by reference to the following illustrative examples, in which the quantities are stated in parts by weight:

Example 1

100 parts of zinc bromide were dissolved in 50 parts of water. The concentrated aqueous solution thus obtained contained about 67% of zinc bromide and under atmospheric pressure it had a boiling point of 115° C. Under vigorous agitation 50 parts of pseudo-ionone (boiling point 128–132° C. at 5 m/m Hg pressure refractive index $n20:1.5320$) were added to the zinc bromide solution which had previously been heated to 100° C. The temperature was increased to reflux temperature (115° C.) over a period of 10 minutes and the solution was kept boiling under reflux. The yellow coloration of the pseudo-ionone turned into dark brown after a few minutes, indicating that the reaction was taking place. The progress of the isomerization may be followed by removing small samples from the reaction mass, washing free from zinc bromide and measuring the refractive index of the oil. In the course of one hour $n20$ had dropped from the original 1.5320 to about 1.5160. After another half hour's time $n20$ was about 1.5130 and thereafter it began to gradually rise, indicating that the isomerization was completed and that resinification was beginning to take place.

After about one and one-half hours the reaction mass was cooled to room temperature. The oil separated on top of the zinc bromide solution and was easily removed therefrom. The zinc bromide solution remained unchanged and was used to isomerize fresh quantities of pseudo-ionone. The crude ionone was washed free from zinc bromide by shaking with water. By fractional distillation under reduced pressure the crude product was freed from a small amount of terpenes and from some residue. The pure ionone obtained boiled at 75–85° at 2.5 m/m Hg pressure and was a mixture of alpha and beta ionone in which the alpha-isomer was slightly dominant. Yield, about 80%.

Example 2

100 parts of zinc iodide were dissolved in 75 parts of water. Under vigorous agitation 50 parts of pseudo-ionone were added and the mixture was quickly heated to reflux temperature. The reaction was analogous to that described in Example 1, an excellent yield of ionone having high purity being obtained.

*Example 3*

One-half the zinc bromide used in Example 1 was replaced by zinc chloride. Isomerization was effected by the mixture of zinc bromide and zinc chloride, and the pure ionone isolated according to the directions of Example 1. The results were quite similar, although it was noted that isomerization took place more slowly due to the presence of the zinc chloride.

*Example 4*

The pseudo-ionone used in the aforementioned examples was replaced by an equal amount of pseudo-methyl-ionone. The procedure described in these examples was then followed, resulting in the production of a good yield of methyl-ionone of excellent purity.

*Example 5*

In place of the pseudo-ionone used in Examples 1, 2 and 3, the crude condensation products of acetone with oil of lemongrass or citral were used. Here again the results were quite satisfactory, being comparable with those produced in the aforementioned examples.

It is to be understood that the foregoing examples were given merely for purposes of illustration and were not intended as a limitation upon the scope of the present invention. This invention is susceptible of considerable variation and modification in the manner of its practical application. For instance, the quantity and concentration of zinc halides may be varied within rather wide limits, although the most satisfactory results are in general obtained by using a relatively concentrated aqueous solution of the isomerizing agent or agents. Mixtures of two or more of the isomerizing agents heretofore described may be used with excellent results. Furthermore, these mixtures may contain varying proportions of the individual halides.

While zinc fluoride causes some isomerization, the results obtained therewith are greatly inferior to the results obtained with the other halides. Zinc chloride gives satisfactory results, but such results are not as satisfactory as when zinc bromide and/or zinc iodide is added to the zinc chloride solution. The use of a solution of zinc bromide or zinc iodide, or a mixture of the two gives considerably better results than could be obtained by the use of either zinc chloride or zinc fluoride.

Experiments have indicated that the isomerization reactions described herein require the use of specific agents, and cannot be predicated upon the usual chemical theories. Chemical theory would ordinarily suggest that compounds chemically related to the zinc halides would also evidence isomerizing abilities in this connection. However, salts such as zinc sulfate, calcium chloride, mono-sodium-phosphate, ammonium chloride, ammonium sulfate, cadmium chloride, magnesium chloride, and cupric chloride, having a similar pH range were tested and negative results obtained thereby.

The temperatures employed may be varied within wide limits, but since the rate of reaction drops with a decrease in temperature it is advisable to maintain the temperature at the approximate boiling point of the aqueous zinc salt solution. The time of reaction likewise varies with the concentration of the isomerizing agent or agents; the preferred time being that wherein the refractive index of the reaction product reaches a minimum.

In place of the pure pseudo-ionones, it is possible to utilize the crude reaction products of methyl-alkyl-ketones and citral or oil of lemongrass as initial components herein. In this connection it is to be understood that where mention is made in the specification and claims to pseudo-ionones this term is intended to include the aforementioned crude reaction products. Purification of the resulting products may be readily accomplished according to well known methods, for example fractional distillation under reduced pressure.

The present invention permits pseudo-ionones to be isomerized with a relatively inexpensive agent. The use of expensive equipment, and the necessity of tedious extractions or dilutions and reconcentrations is entirely obviated. The products are easily separated from the isomerizing agent, and the latter may again be used for the isomerization of fresh material. Needless to say this results in a tremendous saving. High yields of products having excellent purity are produced. The progress of the isomerization is readily controlled, and since the conditions may be varied within wide limits without impairing the results, the invention is particularly applicable to large scale production.

As many apparently widely different embodiments of this invention may be made without departing from the spirit and scope thereof, it is to be understood that the invention is not limited to the specific embodiments thereof except as defined in the appended claims.

I claim:

1. In the process of producing ionones by the isomerization of pseudo-ionones, the step which comprises treating at elevated temperatures the pseudo-ionone with an aqueous solution of a member selected from the group consisting of zinc iodide, zinc bromide and zinc chloride.

2. In the process of producing ionones by the isomerization of pseudo-ionones, the step which comprises treating at elevated temperatures the pseudo-ionone with an aqueous solution of at least two members selected from the group consisting of zinc iodide, zinc bromide and zinc chloride.

3. In the process of producing ionones by the isomerization of pseudo-ionones, the step which comprises refluxing the pseudo-ionone with an aqueous solution of a member selected from the group consisting of zinc iodide and zinc bromide.

4. The process of claim 3 wherein the pseudo-ionone is refluxed with an aqueous solution of zinc iodide and zinc bromide.

WALTER CHRISTIAN MEULY.